US006580437B1

United States Patent
Liou et al.

(10) Patent No.: US 6,580,437 B1
(45) Date of Patent: Jun. 17, 2003

(54) SYSTEM FOR ORGANIZING VIDEOS BASED ON CLOSED-CAPTION INFORMATION

(75) Inventors: Shih-Ping Liou, West Windsor, NJ (US); Candemir Toklu, Plainsboro, NJ (US); Madirakshi Das, Rochester, NY (US)

(73) Assignee: Siemens Corporate Research, Inc., Princeton, NJ (US)

( * ) Notice: Subject to any disclaimer, the term of this patent is extended or adjusted under 35 U.S.C. 154(b) by 339 days.

(21) Appl. No.: 09/602,721

(22) Filed: Jun. 26, 2000

(51) Int. Cl.<sup>7</sup> ................................................. G06F 3/00
(52) U.S. Cl. ....................... 345/719; 345/721; 345/853; 725/137
(58) Field of Search ................................ 345/700, 716, 345/719–721, 723, 727, 764, 853; 348/461, 462, 465, 467, 468; 386/52, 55; 707/102, 104.1; 725/137

(56) References Cited

U.S. PATENT DOCUMENTS

| | | | | |
|---|---|---|---|---|
| 5,481,296 A | * | 1/1996 | Cragun et al. | 725/136 |
| 5,521,841 A | * | 5/1996 | Arman et al. | 345/723 |
| 5,703,655 A | * | 12/1997 | Corey et al. | 348/468 |
| 5,708,767 A | * | 1/1998 | Yeo et al. | 345/440 |
| 5,956,453 A | * | 9/1999 | Yaegashi et al. | 386/52 |
| 6,278,446 B1 | * | 8/2001 | Liou et al. | 345/700 |
| 6,360,234 B2 | * | 3/2002 | Jain et al. | 707/500.1 |

* cited by examiner

Primary Examiner—Crescelle N. dela Torre
(74) Attorney, Agent, or Firm—Donald B. Paschburg (57) ABSTRACT

A system for organizing digital videos to archive and access them at different levels of abstraction uses data available from a closed-caption text along with off-the-shelf natural language processing tools to segment the video into self-contained story sections and speaker blocks. If the subject changes are marked, the system uses these points to divide the video into distinct stories which are represented as nodes attached to the root node in a tree structure and groups speaker segments belonging to a story under the story node as its children.

26 Claims, 9 Drawing Sheets

| | |
|---|---|
| 16424 | WEATHER CENTER. |
| 16694 | >>> A [NEW STUDY SHOWS] THAT 1 IN |
| 16773 | 16 DOCTORS SURVEYED HAS HASTENED |
| 16935 | THE DEATH OF A PATIENT BY |
| 17005 | PRESCRIPTION DRUGS. |
| 17067 | DR. THOMAS REARDON JOINS US NOW |
| 17150 | BY PHONE, GOOD EVENING. |
| 17200 | >> WELL, I THING THE SURVEY WAS |
| 17277 | DONE AT A TIME WHEN THERE WAS |
| 17358 | POOR ACTIVE TO QUALITY CARE AND |
| 17443 | IT SHOWS THERE WERE A SMALL |
| 17503 | NUMBER OF PHYSICIANS THAT HAVE |
| 17575 | PARTICIPATED IN PHYSICIAN |
| 17643 | ASSISTED SUICIDE. |
| 17669 | HOWEVER, I WOULD SAY THAT IS |

SYSTEM FOR ORGANIZING VIDEOS BASED ON CLOSED-CAPTION INFORMATION

BACKGROUND OF THE INVENTION

1. Field of the Invention

The present invention relates to the field of video abstraction and archiving, and more specifically, a video organization and indexing system, which uses closed-caption information of the video and natural language processing tools, to enable content-based abstraction and archival of videos.

2. Description of the Prior Art

For a multimedia information system to better meet the users' needs, it must capture the semantics and terminology of specific user domains and allow users to retrieve information according to such semantics. This requires the development of a content-based indexing mechanism, which is rich in its semantic capabilities for abstraction of multimedia information, and also provides canonical representation of complex scenes in terms of objects and their spatio-temporal behavior. A key initial stage in this content-based indexing process is video organization. The objective of video organization is to capture the semantic structure of a video in a form that is meaningful to the user, i.e. providing a video table of contents analogous to the table of contents in a book.

There have been two different approaches to video organization. The research efforts in database systems has mostly focussed on attribute-based indexing of multimedia information which entails a level of abstraction that reduces the scope for posing ad hoc queries to the database. This is described by P. England, R. B. Allen, M. Sullivan, A. Heybey, M. Bianchi, and A. Dailianas in "I/Browse: The Bellcore Video Library Toolkit", Storage and retrieval for Still Image and Video Databases, SPIE, pp. 254–264, February 1996. On the other hand, with the automatic approach, the research in computer vision relies on an integrated feature extraction/object recognition subsystems to segment video into meaningful semantic units. This is described by M. M. Yeung and B. L. Yeo in "Time-constrained Clustering For Segmentation Of Video Into Story Units", International Conference on Pattern Recognition, C, pp. 375–380, 1996; H. J. Zhang, Y. H. Gong, S. W. Smoliar and S. Y. Liu in "Automatic Parsing Of News Video", International Conference on Multimedia Computing and Systems, pp. 45–54, 1994; and D. Swanberg, C. F. Shu and R. Jain in "Knowledge Guided Parsing In Video Databases", Storage and Retrieval for Image and Video Databases, SPIE vol. 1908, pp. 13–25, 1993.

Both approaches to video organization have their own limitations. The attribute-based approach needs a human operator to manually index the multimedia information, but the automatic approach is computationally very expensive, difficult, and tends to be very domain specific. It is nearly impossible to obtain useful video organization in practice based solely on automatic processing.

In addition, automatic approaches do not include closed-caption information analysis to enhance their results. Nowadays, many videos are made available with closed-captioned text or transcripts (in Europe). These include all major news broadcasts, documentaries and motion pictures. Live action video feed is also being closed-captioned online in some cases. While closed-captioned text is intended to aid the hearing-impaired, it can be used to great advantage in the organization and indexing of video for archiving and browsing. With the availability of attached text, words could be used as features for comparing video segments instead of or in addition to visual features extracted from the video frame images. Natural language keywords have much more descriptive power and are much easier to use than abstract image features that often do not correspond to the perceived features of the image. In addition natural language keywords provide higher semantics, thus enabling real content-based video archiving and retrieval. Retrieval based on text has been a focus of research for a long time and powerful tools are available for indexing databases by natural language keywords. Advanced natural language processing tools are also becoming increasingly available. Therefore, it is important to try to use the textual information added to the video to enhance the results obtained from processing the audio and video components of the video alone. However, the closed-caption comes with its costs. It is usually not aligned with the audio-visual information. Often the closed-caption sentences are not complete, and contain misspelled words. Hence, it is believed that the human operator has to be in the loop to correct the automatically produced results and give feedback to them.

An improvement would be a hybrid approach that uses the closed-caption and audio information in addition to the visual information. Thus, the system should automatically segment the video and create the video table of contents in a preprocessing step, while providing an easy-to-use interface for verification, correction and automatically extracted video structure. It is an object of the present invention to provide such a hybrid system for generating organized video, where the video is divided into distinct stories that are further segmented into separate speaker blocks if there are multiple speakers within them. Besides Video Table Of Contents (VTOC) generation, it is an object of the present invention that the system be supported by many other automatic video organization methods, including scene cut-detection, shot grouping based on visual similarity, audio segmentation into music, speech and silence, proper noun extraction from closed-caption, and division of video into different story units by closed-caption analysis.

SUMMARY OF THE INVENTION

The present invention is directed to a system for organizing digital videos to archive and access them at different levels of abstraction. The present invention includes a computer readable storage medium having a computer program stored thereon performing the step of using the data available from the closed-caption text along with off-the-shelf natural language processing tools to segment the video into self-contained story sections and speaker blocks. In further detail, if the subject changes are marked, the system uses these points to divide the video into distinct stories which are represented as nodes attached to the root node in a tree structure and groups speaker segments belonging to a story under the story node as its children. If the subject changes are not marked, the system uses the observation that some common elements will be present when talking about the same subject, such as keywords like names of people, places, organizations etc., thus uses proper nouns to group similar segments into stories by considering the temporal proximity before grouping them into the same story. The system also checks and modifies (if necessary) the results obtained at the previous steps of the video organization using the interactive user interfaces which also provide for proceeding seamlessly from one processing step to the next.

DETAILED DESCRIPTION OF THE INVENTION

The problem of organizing a video to facilitate access has received wide attention recently. The need to further group shots into semantically meaningful divisions is needed due to the very large number of shots generated from any video of reasonable duration. Among those who have approached this problem, most use strong domain knowledge to separate the main stories in the video. H. J. Zhang, Y. H. Gong, S. W. Smoliar and S. Y. Liu in "Automatic Parsing Of News Video", International Conference on Multimedia Computing and Systems, pp. 45–54, 1994, use known templates of anchor person shots to separate news stories. D. Swanberg, C. F. Shu and R. Jain in "Knowledge Guided Parsing In Video Databases", Storage and Retrieval for Image and Video Databases, SPIE vol. 1908, pp. 13–25, 1993, use known structures of news programs in addition to models of anchor person shots to parse news videos. Y. L. Chang, W. Zeng, I. Kamel, and R. Alonso in "Integrated Image And Speech Analysis For Content-based Video Indexing", in Proc. of the Int'l Conf. on Multimedia Computing and Systems, (Hiroshima, Japan), pp. 306–313, IEEE Computer Society, Jun. 17–21, 1996, proposed to use cheer and keyword detection from the audio track, in addition to the image analysis, to extract the important events in football videos. A. Merlino, D. Morey and M. Maybury in "Broadcast News Navigation Using Story Segmentation", ACM Multimedia Conference Proceedings, (Seattle, Wash.), pp. 381–391, Nov. 9–13, 1997, also exploits the parallel signals found in video, such as audio and closed-caption, to enable story segmentation and summarization of broadcast news.

Domain-independent video organization methods can be segmented into two groups: methods that use only visual information, and methods that use audio and visual information. M. M. Yeung, and B. L. Yeo in "Time-constrained Clustering For Segmentation Of Video Into Story Units", International Conference on Pattern Recognition, C, pp. 375–380, 1996, presented a domain-independent approach that extracts story units (the top level in a hierarchy) for video browsing applications. Their approach first detects shots, identifies shots that have similar visual appearances, detects story units, and creates a scene transition graph. However, this representation reveals little information about the semantic structure within a story unit, e.g. an entire news broadcast is classified as a single story, making it difficult to cluster similar shots which are temporally far apart, e.g. the anchor-person shots in a news broadcast are usually scattered throughout the video. Recently, Y. Rui, T. S. Huang and S. Mehrotra in "Exploring Video Structure Beyond The Shots", IEEE Conference on Multimedia Computing and Systems, pp. 237–240, 1998, have proposed an algorithm for segmenting a video into scenes which are groups of semantically related shots. They use visual similarity and temporal locality to group shots.

Unlike others, J. Nam, A. E. Cetin, and A. H. Tewfik in "Speaker Identification And Video Analysis For Hierarchical Video Shot Classification", Proceedings of the IEEE Inter. Conf. Image Processing, (Santa Barbara, Calif.), Oct. 26–29, 1997, proposed a domain independent method for hierarchical clustering of video shots based on visual and audio cues. Their representation can also provide video access at different levels of abstraction, e.g., browsing the video shots for the same speaker. However, the number of speakers in the video has to be known prior to the clustering and the speaker identification system has to be trained for these speakers. In addition, they do not address how to extend this method to obtain semantic segmentation of the video at the story level.

Informedia project described by A. G. Hauptmann and M. A. Smith in "Text, Speech, And Vision For Video Segmentation: The Informedia Project", in Proc. of the AAAI Fall Symposium on Computational Models for Integrating Language and Vision, 1995, suggested an alternative approach for video organization. Rather than finding similar or repeating shots, they use silence detection in the audio to segment video into acoustic paragraphs. Within a paragraph, scenes are isolated and clustered into video segments through the use of various image understanding techniques. The stories are not separated by long silence segments in many videos. On the contrary, the anchor person changes from one subject to another without any silence or commercial break in broadcast news videos. Consequently, the resulting acoustic paragraphs usually do not correspond to stories.

In pending U.S. patent application Ser. No. 09/027,637 entitled "A System for Interactive Organization and Browsing of Video", filed on Feb. 23, 1998, and assigned to the same assignee as the present invention, another domain-independent approach based on visual cues is proposed, which produces a hierarchical tree structure showing further detailed structure in the video. Pending U.S. patent application Ser. No. 09/027,637 is hereby incorporated by reference. The present invention extends this approach by incorporating closed-caption analysis to the automatic processing tools and makes use of speaker changes as the shot unit rather than the scene changes. In addition to textual representation of the spoken words from the audio component of the video, closed-caption text also contains additional markers for a change of speaker and in many cases, special markers for indicating a change of subject as well. Speaker change markers may take different forms depending on the source from which the video was acquired, e.g. name of the speaker followed by a colon, or the ">>" symbol are commonly used to indicate a change of speaker. A change of subject is less commonly marked since it is hard to do so without knowing the content of the broadcast at the time of captioning. When they are marked, a ">>>" symbol is often used at the point the subject is being changed.

Figure 1:
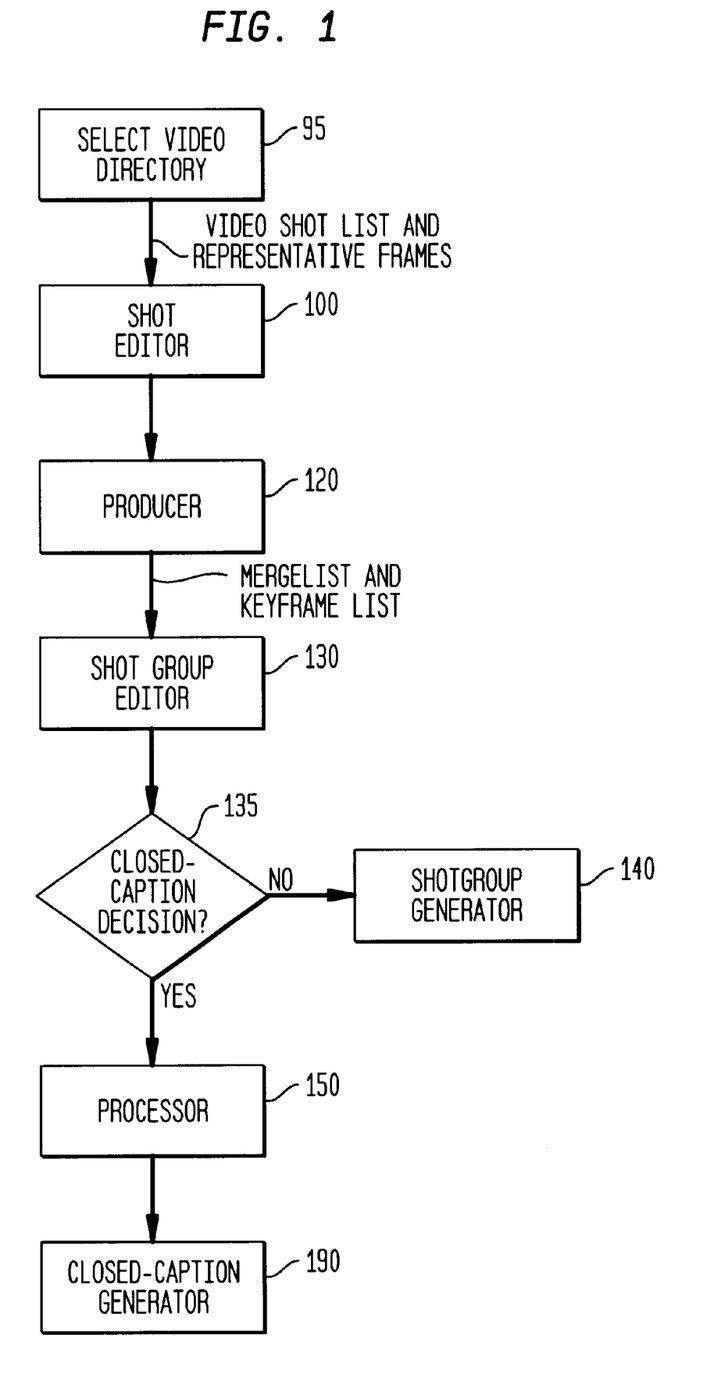
FIG. 1 is an overall block diagram of the present invention.

FIG. 1 shows the overall framework of the present invention. Automatic processing is interleaved with user interfaces for providing corrections and modifications. There is a smooth transition from one level to the next by selecting the appropriate function to perform the next task using menus provided in the interface.

The shots generated automatically are stored in a shotlist file as pairs of begin and end frames. Shot detection has been presented in U.S. Pat. No. 5,835,163 entitled "Apparatus For Detecting A Cut In A Video", issued on Nov. 10, 1998, and assigned to the same assignee as the present invention. Each shot has a representative frame which is the first frame of the shot. Referring to FIG. 1, a select video directory 95 provides a video shot list and representative frames. These images are browsed using an interface, shot editor 100. Shot editor 100 edits shots using a shotTree interface and saves a shotlist. This is further described in U.S. patent application Ser. No. 08/576,271 entitled "Cut Browsing And Editing Apparatus", filed on Dec. 21, 1995, now abandoned, and hereby incorporated by reference. This interface has been enhanced by using audio analysis tools described in pending U.S. patent application Ser. No. 09/518,300, entitled "Method And System For Video Browsing And Editing By Employing Audio", filed Mar. 3, 2000, assigned to the same assignee as the present invention and hereby incorporated by reference. The interface of the present invention shows the icon images attached to the root of the tree in chronological order. It is possible to split shots and merge adjacent shots using the video cross-section provided in the interface. If a shot is split into two, then this interface generates the representative frame for the new shot. It is also possible to delete shots corresponding to parts of the video in which the user is not interested, e.g. deleting advertisements from news broadcasts. The updated shotlist can be saved.

In producer 120, the representative frames corresponding to shots in the updated shotlist are processed to find groups of visually similar shots and the resulting information is written to a mergelist file. Producer 120 therefore produces the mergelist from the shotlist. The method for finding visually similar shots is described in pending U.S. patent application Ser. No. 09/027,637 described above. The shotlist is also used to generate a keyframelist, which are additional distinct images from the body of the shot.

Figure 5:
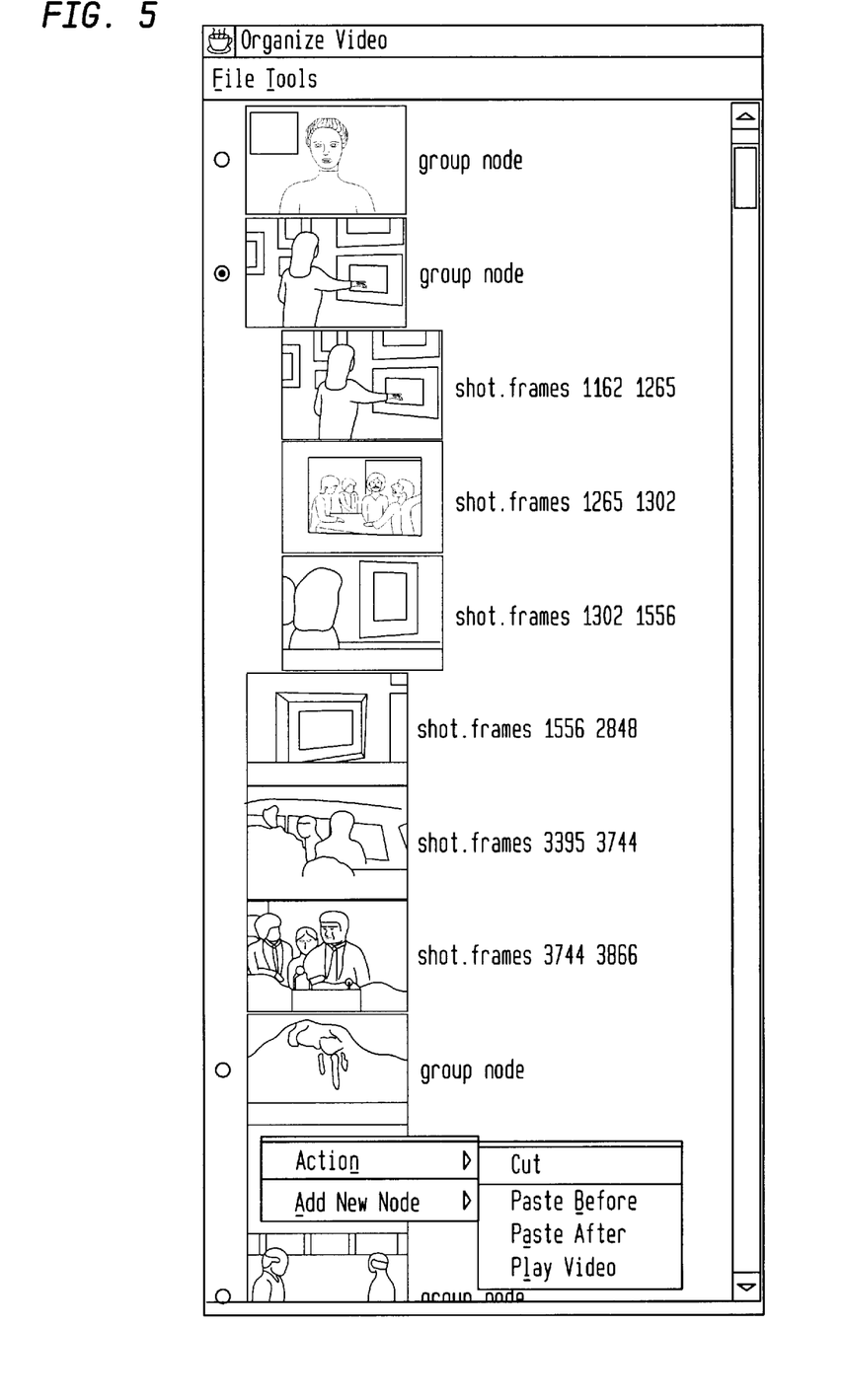
FIG. 5 displays a mergeTree interface and its functionalities.

The results of producer 120, the mergelist and the keyframelist, can be viewed and edited using the shot group editor 130. This interface can be used to check the similar groups obtained for correctness, move shots in and out of groups, and create new groups of similar shots as shown in FIG. 5. Shot group editor 120, therefore, edits the shot groups using a mergeTree interface and saves and updated mergelist. The changes made are stored in an updated mergelist file.

The next step in the generation of an organized tree depends on whether additional information, in the form of closed-caption text, is available. This decision occurs in closed caption decision 135. If no closed-caption information is available, an organized tree is generated in shotgroup generator 140, from the repeating shots found in the mergelist using the technique described in pending U.S. patent application Ser. No. 09/027,637. If closed-caption data is available, processor 150 processes the closed caption data to extract useful information and closed caption generator 190, constructs an organized tree using this information.

Figure 6:
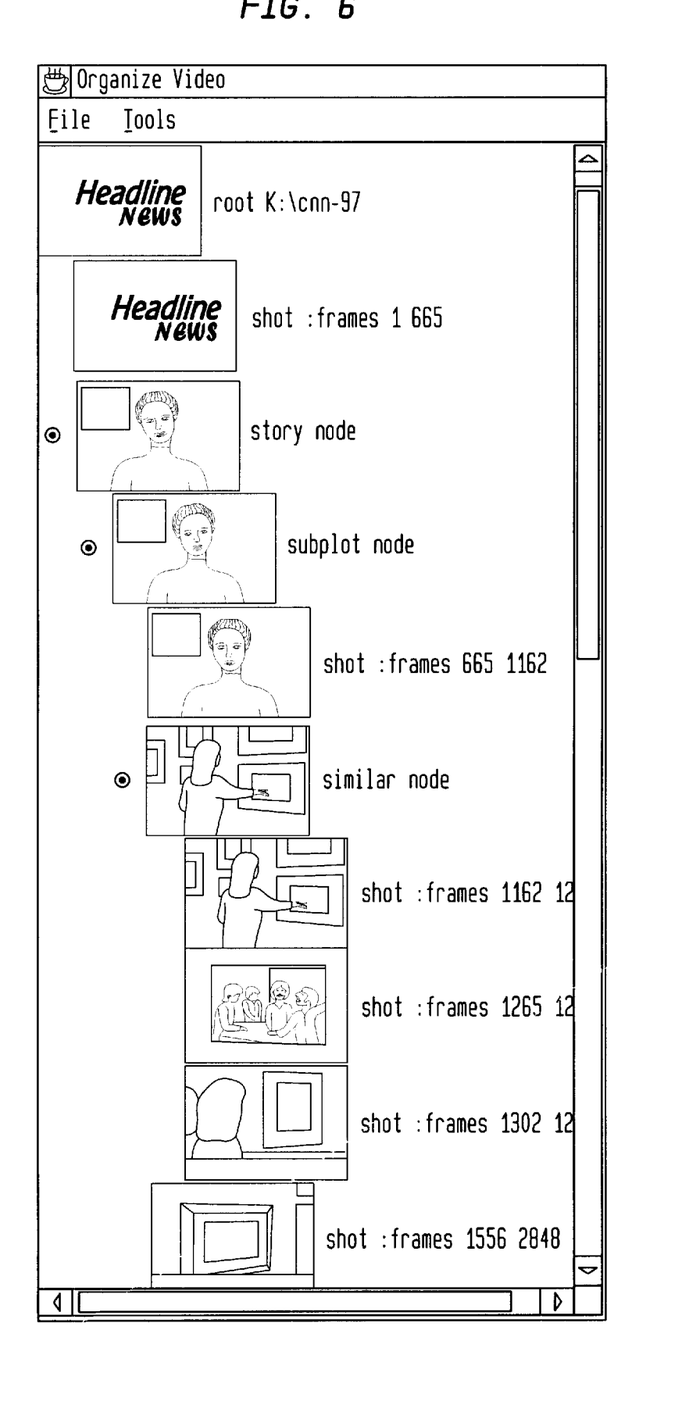
FIG. 6 depicts a video table of contents generated for a broadcast news video based only on visual cues.

The organized tree is used to provide summaries of the main stories in the video in the form of text and images in the case where closed-caption text is available, and images when no text is present as depicted in FIG. 6.

Figure 2:
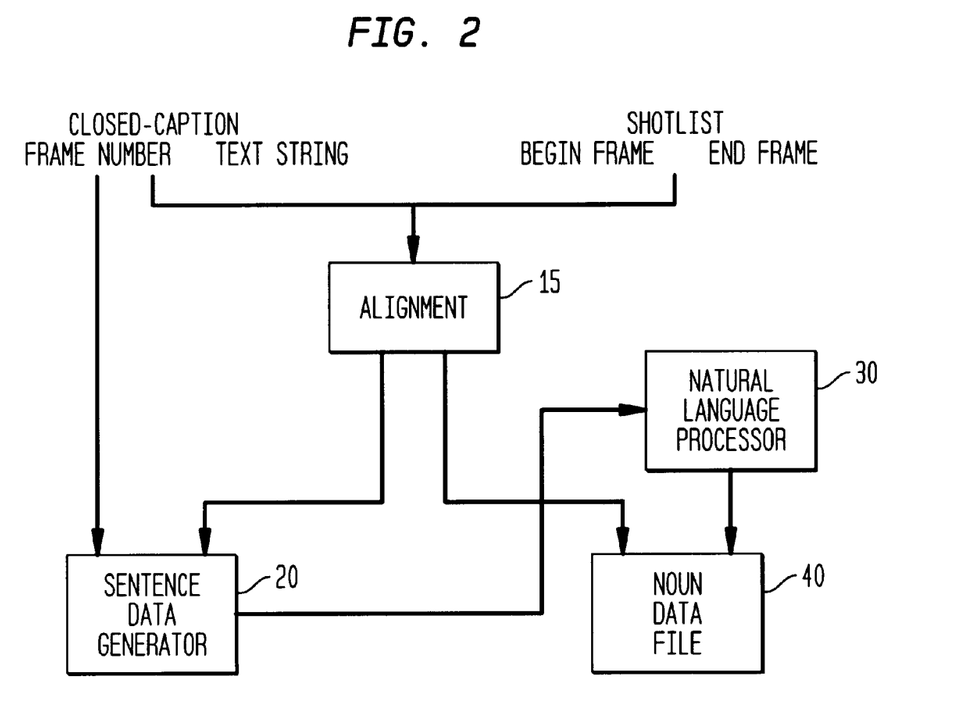
FIG. 2 is a block diagram of the processor shown in FIG. 1 wherein closed caption data is processed.
Figure 7:
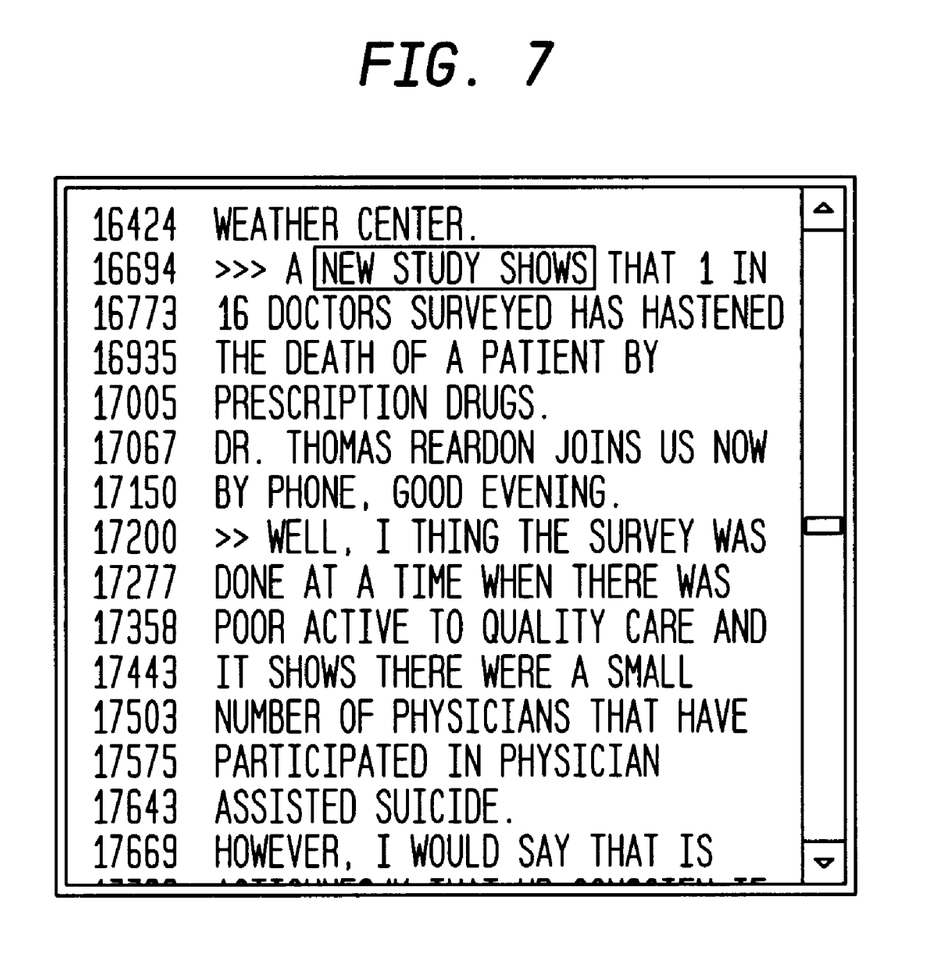
FIG. 7 shows a portion of the closed-caption text for the broadcast news video.

FIG. 2 is a block diagram of processor, 150 of FIG. 1, wherein the closed-caption data mentioned in processed for generating the organized tree. The raw closed-caption data file consists of lines of text along with the last frame number in the video. The text occurs as is depicted in FIG. 7. There are special symbols marking the beginning of new speaker segments and in many cases, the start of a new subject segment as well. Since the closed caption is not perfectly aligned with the speech component of the video, lagging it a little in most cases, some alignment needs to be done to match the text to the video. Referring to FIG. 2, closed-caption frame number/text string and shotlist begin frame/end frame 12 information is provided. Alignment 15 occurs based on the observation that a new segment of text is usually accompanied by a change in the shot which is, starting a new shot (e.g. when a new story starts, the visual moves to the scene of the new story). So the start of each segment is aligned with the start frame of the shot which contains the first frame of the segment. Similarly, the end of a segment usually extends to the end of a shot. Therefore, the segment end is extended to the last frame of the shot containing the last frame of the segment according to the closed caption.

Figure 8:
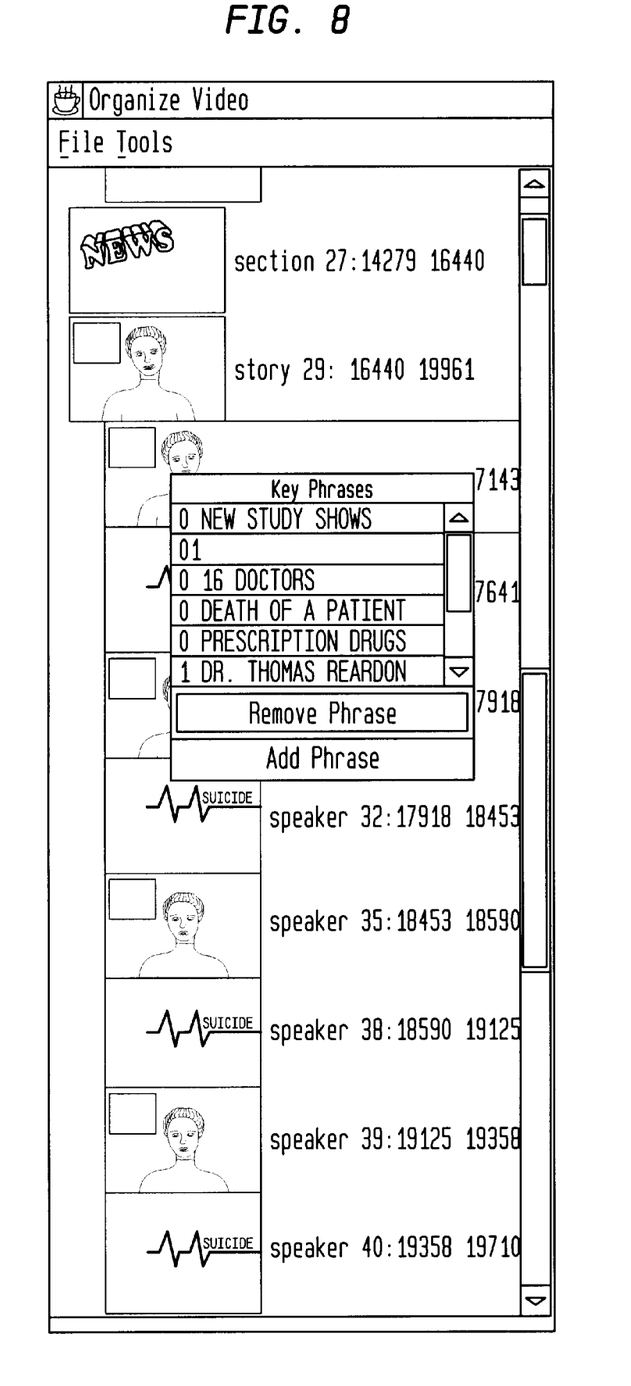
FIG. 8 depicts an editing tool for a list of noun phrases and proper nouns automatically generated from the closed-caption text.

Sentences are considered to be the basic blocks in the closed-caption text. At this point, in sentence data generator 20, a list of sentences is generated for each section. In natural language processor 30, the sentences are further processed using word tagger and noun phrase recognizer, to extract noun phrases and proper nouns, which are useful components for providing clues about the contents of the sentence. When extracting noun phrases, the longest valid noun phrase is found. Proper nouns found include names of people, organizations, places and times. These data are stored in a noun data file 40, which is indexed by the segment and the sentence number within the segment. The user interface allows the operator to check and update these data as depicted in FIG. 8.

Figure 3:
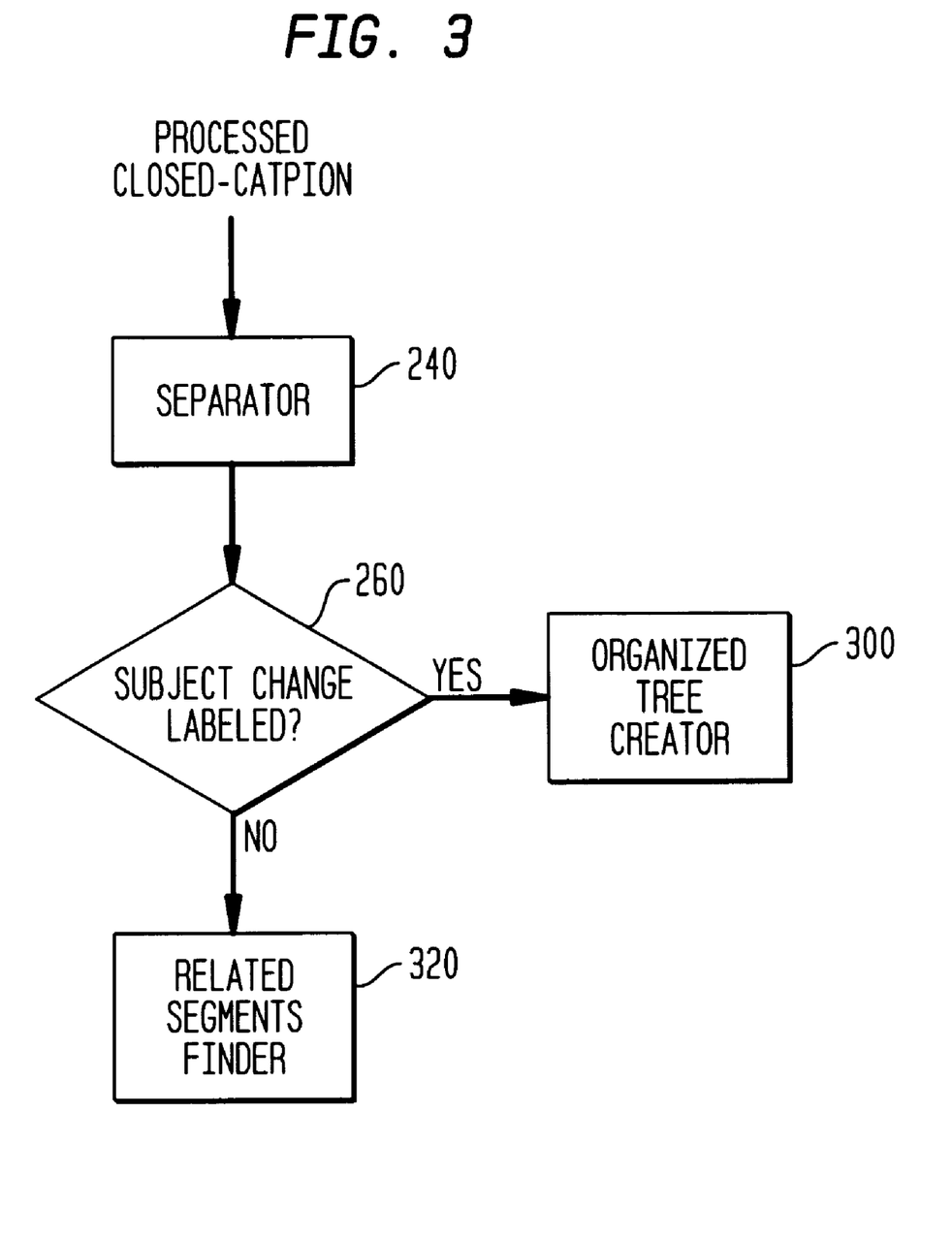
FIG. 3 is a block diagram of the closed caption generator of FIG. 1 wherein an organized tree based on the closed caption data is generated.

FIG. 3 is a block diagram of closed caption generator, 190 of FIG. 1, where an organized tree is generated based on the processed closed caption data. Referring to this figure, the method that is used to construct the organized tree from the processed closed-caption data depends on whether a change of subject, starting a new story, is marked by a special symbol in the closed-caption data. This occurs in separator 240, which separates segments based on closed-caption labels. Through subject change decision 260, if a change of subject is labeled, each new subject is attached to the root node as a different story. This occurs in organized tree creator 300. Each story may have one or more speaker segments, which are attached to the story node. So the organized tree consists of a number of distinct stories with different speakers within the same story. Organized tree creator 300 creates an organized tree with each subject as a separate node, including related speakers within the subject node.

When subject change is not labeled in the closed-caption data, the only segments available as inputs are speaker segments. In this case, it is necessary to group speakers into stories. This occurs in related segments finder 320. This grouping is done by the assumption that there will be some common elements within the same story. The common elements used in this example are the proper nouns in the text. The same story usually will have the same persons, places and organizations mentioned repeatedly in the body of the text. These elements are matched to group speaker segments into stories. Related segments finder 320, therefore, finds related segments using proper nouns and groups them into separate tree nodes. Once stories have been identified, the tree construction is the same as described in the previous paragraph.

Figure 4:
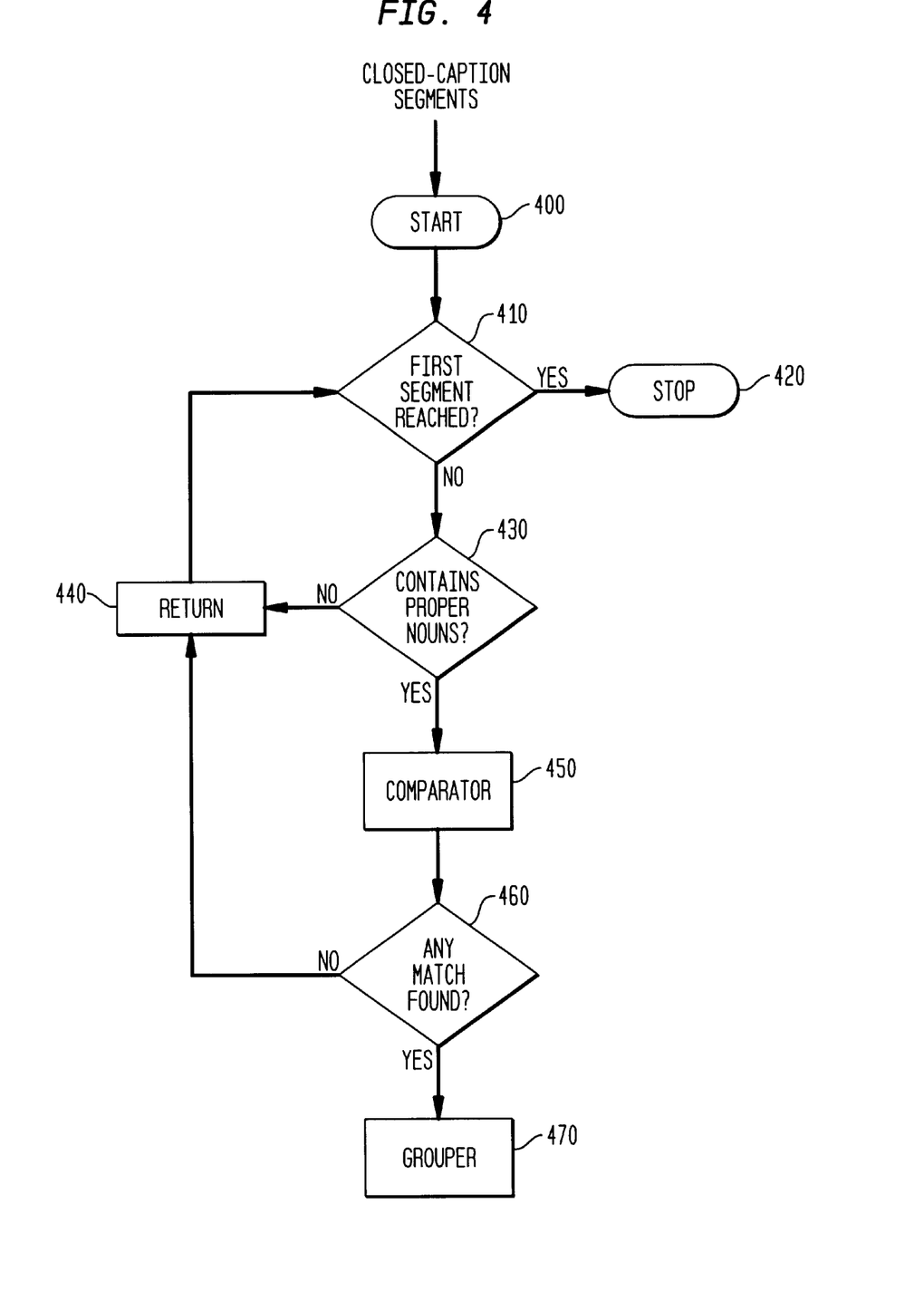
FIG. 4 is a block diagram of the related segments finder shown in FIG. 3 wherein segments based on a matched proper noun are linked.

FIG. 4 is a block diagram of related segments finder, 320 of FIG. 3. Referring to FIG. 4, closed caption segments are provided and through start 400, the system starts with the last segment. At first segment decision 410, there is a decision of whether a first segment is reached. If a first segment is reached, the system stops 420. If a first segment is not reached, at proper noun decision 430, there is a decision of whether there is a proper noun. If there is not a proper noun, the system goes to return 440 where the system goes to the previous segment. If there is a proper noun, in comparator 450 there is an attempt to match the proper nouns with preceding segments going back a maximum of about 2.5 minutes of actual time (which corresponds to about 4500 frames). The search is localized to a limited time band because there is no desire for widely separated segments to be merged together when there are no common elements found in the segments between them. Segments far from each other can still be in the same story if there are matching proper nouns found in the intermediate segments. This is assured because an incremental search is performed, going from each segment to its previous one and the search is extended to a fixed number of frames in the past.

Proper nouns are matched as sub-strings so that a person's full name matches his/her surname or first name as well. Similarly, a full place name (including the state) matches the name of the place and vice versa. Through match decision 460, when a match is found, in grouper 470, all segments between the current and the matched segment are grouped under one subject. This is very useful since all segments do not have proper nouns to match, but if they are embedded between two matching segments, they still become a part of the same story unit.

Figure 9:
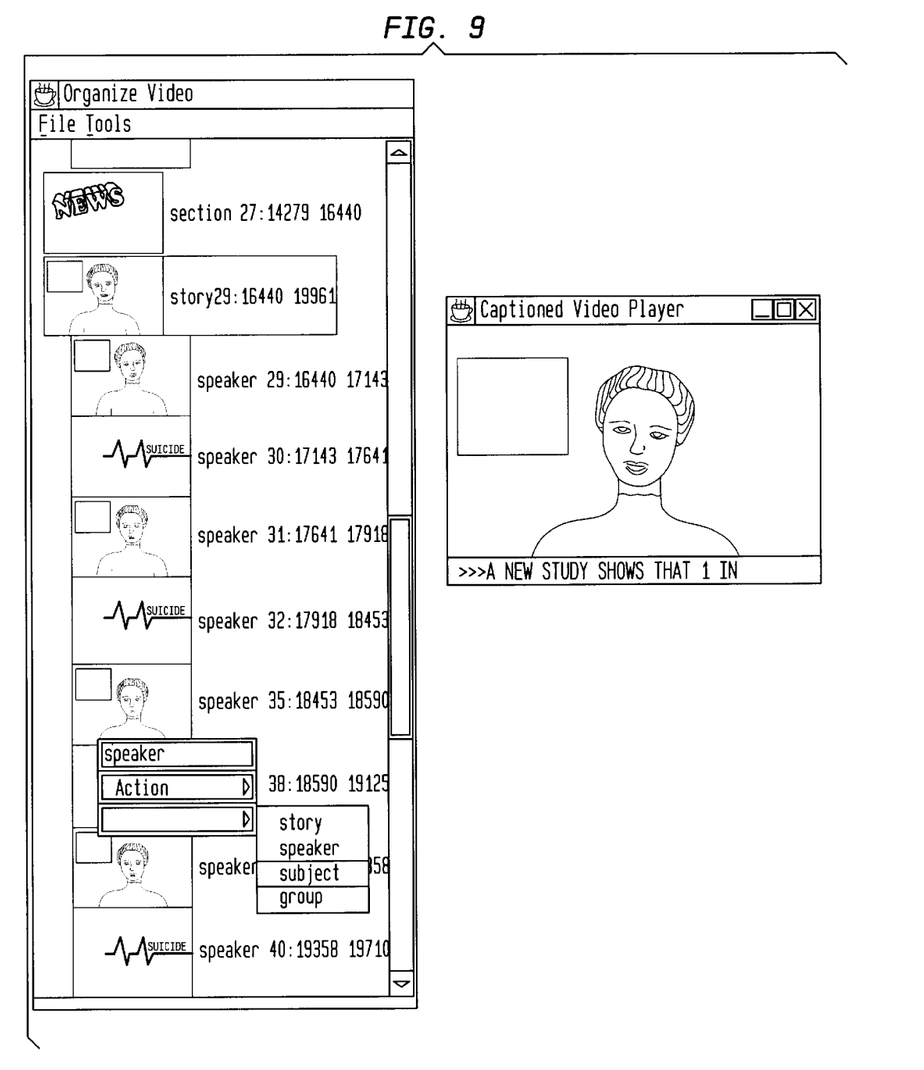
FIG. 9 depicts the video table of contents generated for the same broadcast news video based on the closed-caption text and a video player with closed-caption display capability. The functionalities of a user interface at this level are also displayed.

The organized tree constructed in this manner has nodes corresponding to the stories that are attached to the root node with speaker blocks within a story being attached to the story nodes. This allows easy browsing of the top-level stories in the whole broadcast. This tree can also be viewed and edited in an interactive interface as depicted in FIG. 9. The nodes can be moved and video corresponding to a given speaker or story node can be played on a captioned video player (FIG. 9), which is a part of the interface.

In conclusion, the present invention provides a system for organizing digital videos to archive and access them at different levels of abstraction. This invention makes use of the closed-caption information, if it is available, and produces a video table of contents based on the reappearing shots in a video, and common proper nouns in the closed caption text. The present invention includes a hybrid approach, i.e., the system automatically segments the video and creates the video table of contents in a preprocessing step, while providing an easy-to-use interface for verification and correction of the automatically extracted video structure. In addition, the user interface serves as a feedback mechanism to the automatic processing units. Compared to previous approaches that use scene changes, the present invention uses change signals present in the closed-caption text to define shots and stories. Hence, the video is divided into distinct stories that are further segmented into separate speaker blocks if there are multiple speakers within them.

What is claimed is:

1. A system for indexing video comprising:
    a video directory;
    a shot editor connected to said video directory for browsing and editing the video directory to produce a shotlist;
    a producer connected to said shot editor for producing a mergelist and a keyframelist from the shotlist;
    a shot group editor connected to said producer for editing the mergelist and the keyframelist;
    a closed-caption decision connected to said shot group editor for determining if closed-caption text is available;
    a processor connected to said closed-caption decision for processing the closed-caption text to extract data, wherein said data includes change signals; and
    a closed-caption generator connected to said processor for generating subject segments and speaker segments using the data, wherein said closed-caption generator further defines shots and stories using said change signals.

2. The system of claim 1, wherein the video includes audio and visual information.

3. The system of claim 1, wherein the video directory comprises a video shot list and representative frames.

4. The system of claim 1, wherein the closed-caption text comprises lines of text and frame numbers, wherein said lines of text include speaker markers for marking a beginning of different speaker segments.

5. The system of claim 1, wherein the producer produces the mergelist and the keyframelist by finding groups of visually similar shots in the shotlist.

6. The system of claim 1, wherein the shot group editor edits the mergelist and the keyframelist to check groups of visually similar shots for correctness, to move shots in and out of groups, and to create new groups of visually similar shots.

7. The system of claim 1, wherein the processor processes the closed-caption text by aligning the closed-caption text to the video, generating sentences from the closed-caption text, extracting noun phrases and proper nouns from the sentences, and storing said noun phrases and proper nouns in a noun data file.

8. A system for indexing video comprising:
    a video directory;
    a shot editor connected to said video directory for browsing and editing the video directory to produce a shotlist;
    a producer connected to said shot editor for producing a mergelist and a keyframelist from the shotlist;
    a shot group editor connected to said producer for editing the mergelist and the keyframelist;
    a closed-caption decision connected to said shot group editor for determining if closed-caption text is available;
    a processor connected to said closed-caption decision for processing the closed-caption text to extract data, wherein the closed-caption text comprises lines of text and frame numbers, wherein said lines of text include speaker markers for marking a beginning of different speaker segments; and
    a closed-caption generator connected to said processor for generating subject segments and speaker segments using the data, wherein the closed-caption generator generates the subject segments and the speaker segments by determining whether different subject segments in the data are marked by subject markers, wherein if it is determined that different subject segments in the data are marked by subject markers, further comprising:
        a separator for separating the different subject segments into separate nodes using the subject markers, and for separating the different speaker segments into separate speaker segments using the speaker markers; and an organized tree creator for creating an organized tree comprising the separate nodes and attaching corresponding separate speaker segments to each separate node.

9. The system of claim 8, wherein if it is determined that the different subject segments in the data are not marked by subject markers, further comprising:

a related segments finder for finding related segments in the different speaker segments using common elements and grouping the related segments into separate nodes.

10. The system of claim 9, wherein the common elements comprise proper nouns in the closed-caption text.

11. A method of indexing video comprising the steps of:

providing a video directory;

browsing and editing said video directory using a shot editor to produce a shotlist;

producing a mergelist file and a keyframelist from the shotlist using a producer;

editing the mergelist file and the keyframelist using a shot group editor;

determining if closed-caption text of said video is available, wherein if closed-caption text is determined to be available;

processing said closed-caption text to extract data, wherein said data includes change signals; and segmenting the video into subject segments and speaker segments using the data, wherein segmenting further includes defining shots and stories using said change signals.

12. The method of claim 11, wherein the video includes audio and visual information.

13. The method of claim 11, wherein the video directory comprises a video shot list and representative frames.

14. The method of claim 11, wherein the closed-caption text comprises lines of text and frame numbers, wherein said lines of text include speaker markers for marking a beginning of different speaker segments.

15. The method of claim 11, wherein the step of processing includes the steps of:

aligning the closed-caption text to the video;

generating sentences from the closed-caption text;

extracting noun phrases and proper nouns from the sentences; and storing said noun phrases and proper nouns in a noun data file.

16. The method of claim 11, wherein the mergelist file comprises groups of visually similar shots.

17. The method of claim 11, wherein the keyframelist comprises additional distinct images from the shotlist.

18. The method of claim 11, wherein the shotlist comprises pairs of begin and end frames.

19. A method of indexing video comprising the steps of:

providing a video directory;

browsing and editing said video directory using a shot editor to produce a shotlist;

producing a mergelist file and a keyframelist from the shotlist using a producer;

editing the mergelist file and the keyframelist using a shot group editor;

determining if closed-caption text of said video is available, wherein if closed-caption text is determined to be available;

processing said closed-caption text to extract data, wherein the closed-caption text comprises lines of text and frame numbers, wherein said lines of text include speaker markers for marking a beginning of different speaker segments; and segmenting the video into subject segments and speaker segments using the data, wherein the step of segmenting includes the steps of determining whether different subject segments in the data are marked by subject markers, wherein if it is determined that different subject segments in the data are marked by subject markers, further comprising the steps of:

separating the different subject segments into nodes using the subject markers;

separating the different speaker segments using the speaker markers to form separate speaker segments; and creating an organized tree comprising the nodes and attaching the separate speaker segments to each corresponding node.

20. The method of claim 19, wherein if it is determined that the different subject segments in the data are not marked by subject markers, the step of segmenting further comprises the steps of:

determining common elements in the different speaker segments; and matching the common elements within the different speaker segments to form related segments, wherein the related segments are grouped into corresponding nodes.

21. The method of claim 20, wherein the common elements comprise proper nouns in the closed-caption text.

22. A program storage device readable by machine, tangibly embodying a program of instructions executable by the machine to perform the method steps for indexing video, the method comprising the steps of:

providing a video directory;

browsing and editing said video directory using a shot editor to produce a shotlist;

producing a mergelist file and a keyframelist from the shotlist using a producer;

editing the mergelist file and the keyframelist using a shot group editor;

determining if closed-caption text of said video is available, wherein if closed-caption text is determined to be available;

processing said closed-caption text to extract data, wherein said data includes change signals; and segmenting the video into subject segments and speaker segments using the data, wherein segmenting further includes defining shots and stories using said change signals.

23. The program storage device of claim 22, wherein the closed-caption text comprises lines of text and frame numbers, wherein said lines of text include speaker markers for marking a beginning of different speaker segments.

24. The program storage device of claim 22, wherein the instructions for performing the step of processing includes instructions for:

aligning the closed-caption text to the video;

generating sentences from the closed-caption text;

extracting noun phrases and proper nouns from the sentences; and storing said noun phrases and proper nouns in a noun data file.

25. A program storage device readable by machine, tangibly embodying a program of instructions executable by the machine to perform the method steps for indexing video, the method comprising the steps of:

provinding a video directory;

browsing and editing said video directory using a shot editor to produce a shotlist;

producing a mergelist file and a keyframelist from the shotlist using a producer;

editing the mergelist file and the keyframelist using a shot group editor;

determining if closed-caption text of said video is available, wherein if closed-caption text is determined to be available;

processing said closed-caption text to extract data, wherein the closed-caption text comprises lines of text and frame numbers, wherein said lines of text include speaker markers for marking a beginning of different speaker segments; and segmenting the video into subject segments and speaker segments using the data, wherein the instructions for performing the step of segmenting includes instructions for:

determining whether different subject segments in the data are marked by subject markers, wherein if it is determined that different subject segments in the data are marked by subject markers, further comprising instructions for:

separating the different subject segments into nodes using the subject markers;

separating the different speaker segments using the speaker markers to form separate speaker segments; and creating an organized tree comprising the nodes and attaching the separate speaker segments to each corresponding node.

26. The program storage device of claim 25, wherein if it is determined that the different subject segments in the data are not marked by subject markers, the instructions for segmenting further comprises instructions for performing the steps of:

determining common elements in the different speaker segments; and matching the common elements within the different speaker segments to form related segments, wherein the related segments are grouped into corresponding nodes and the common elements comprise proper nouns in the closed-caption text.

\* \* \* \* \*